United States Patent
Zhang et al.

(10) Patent No.: US 11,661,201 B2
(45) Date of Patent: May 30, 2023

(54) INDEPENDENT SPEED VARIABLE FREQUENCY GENERATOR FOR MORE ELECTRIC AIRCRAFT USING BRUSHLESS DOUBLY-FED MACHINES (BDFM)

(71) Applicant: Ohio State Innovation Foundation, Columbus, OH (US)

(72) Inventors: Julia Zhang, Dublin, OH (US); Longya Xu, Dublin, OH (US); Peng Peng, Lewis Center, OH (US)

(73) Assignee: Ohio State Innovation Foundation, Columbus, OH (US)

(*) Notice: Subject to any disclaimer, the term of this patent is extended or adjusted under 35 U.S.C. 154(b) by 88 days.

(21) Appl. No.: 17/206,354

(22) Filed: Mar. 19, 2021

(65) Prior Publication Data
US 2021/0380263 A1   Dec. 9, 2021

Related U.S. Application Data

(60) Provisional application No. 62/991,683, filed on Mar. 19, 2020.

(51) Int. Cl.
| | | |
|---|---|---|
| *F04D 15/00* | (2006.01) | |
| *H02K 7/14* | (2006.01) | |
| *B64D 27/24* | (2006.01) | |
| *F01D 15/10* | (2006.01) | |
| *B60L 50/10* | (2019.01) | |
| *B60L 50/50* | (2019.01) | |
| *B60W 10/04* | (2006.01) | |
| *B64D 35/00* | (2006.01) | |
| *F02C 9/42* | (2006.01) | |

(Continued)

(52) U.S. Cl.
CPC .............. *B64D 27/24* (2013.01); *B60L 50/10* (2019.02); *B60L 50/50* (2019.02); *B60W 10/04* (2013.01); *B64D 35/00* (2013.01); *F01D 15/10* (2013.01); *F02C 9/42* (2013.01); *H02P 25/00* (2013.01); *B64D 2027/026* (2013.01); *B64D 2221/00* (2013.01)

(58) Field of Classification Search
CPC ......... B60L 50/50; B60L 50/10; B60W 10/04; F02C 9/42; H02P 25/00
USPC ............................................................ 318/3
See application file for complete search history.

(56) References Cited

U.S. PATENT DOCUMENTS 10,689,082 B2 *   6/2020   Armstrong ............. B63H 21/21
10,814,991 B2 * 10/2020   Shah ....................... B64D 27/24
(Continued)

OTHER PUBLICATIONS

Mike Sinnett, "787 No-Bleed Systems: saving fuel and enhancing operational efficiencies," Boeing Aero Mag., vol. 4, pp. 6-11, 2007.

(Continued)

*Primary Examiner* — Erick D Glass
(74) *Attorney, Agent, or Firm* — Meunier Carlin & Curfman LLC (57) ABSTRACT

A turboelectric distributed propulsion based on brushless doubly-fed machines (BDFMs) is provided, which minimizes power conversion, enhances mechanical reliability, and strengthens fault-tolerance capability of a DC-based propulsion system. A turboelectric distributed propulsion (TeDP) architecture using BDFMs for aviation applications, and a designed BDFM, inverter, and controller are provided. Simulations and systems are also provided.

16 Claims, 10 Drawing Sheets

(51) Int. Cl.
    H02P 25/00    (2006.01)
    B64D 27/02    (2006.01)

(56) References Cited

U.S. PATENT DOCUMENTS

| | | | | |
|---|---|---|---|---|
| 2008/0157593 | A1* | 7/2008 | Bax | B60L 58/10 |
| | | | | 307/19 |
| 2011/0215641 | A1* | 9/2011 | Peterson | H02J 4/00 |
| | | | | 307/23 |
| 2013/0313894 | A1* | 11/2013 | Settemsdal | B60R 16/033 |
| | | | | 307/9.1 |
| 2014/0333127 | A1* | 11/2014 | Edwards | H02J 4/00 |
| | | | | 307/9.1 |
| 2018/0079515 | A1* | 3/2018 | Harwood | B61C 5/00 |
| 2018/0252158 | A1* | 9/2018 | Malkamäki | F02C 1/06 |
| 2020/0215922 | A1* | 7/2020 | Sawata | H02P 9/008 |

OTHER PUBLICATIONS

Marty K. Bradley, Christopher K. Droney, "Subsonic ultra-green aircraft research Phase II: N+4 advanced concept development" Technical report by Boeing research and technology, May 2012. 148 pages.

James L. Felder, Hyun Dae Kim, etc., "Turboelectric distributed propulsion cycle analysis for hybrid-wing-body aircraft," AIAA Aerospace Sciences Meeting, Orlando, FL, 2009, 25 pages.

James L. Felder, Gerald V. Brown, Hyun Dae Kim, Julio Chu, "Turboelectric distributed propulsion in a hybrid wing body aircraft," 20th International Society for Airbreathing Engines (ISABE 2011), Gothenburg, Sweden, Sep. 2011. 20 pages.

Xiaolong Zhang, Cheryl L. Bowman, etc., "Large electric machines for aircraft electric propulsion," IET Electr Power., vol. 12, No. 6, pp. 767-779, 2018.

Committee on propulsion and energy systems to reduce commercial aviation carbon emissions, Aeronautics and space engineering board, Division on engineering and physical sciences, National academies of sciences, engineering and medicine, "Commercial aircraft propulsion and energy system research: reducing global carbon emissions," The National Academies Press, 2016, 122 pages.

Ningfei Jiao, Weiguo Liu, Tao Meng, Jichang Peng, Shuai Mao, "Design and control of a two-phase brushless exciter for aircraft wound-rotor synchronous starter/generator in the starting mode," IEEE Trans. Power Electr., vol. 31, No. 6, pp. 4452-4461, Jun. 2016.

Serhiy Bozhiko, Tao Yang, etc., "Development of aircraft electric starter-generator system based on active rectification technology," IEEE Trans. Transp Electr., vol. 4, No. 4, pp. 985-996, Dec. 2018.

Caio A. Ferreira, Stephen R. Jones, etc., "Detailed design of a 30-kW switched reluctance starter/generator system for a gas turbine engine application," IEEE Trans. Ind Appl., 1993, 97-105.

Milutin G. Jovanovic, Robert E. Betz, Jian Yu, "The use of doubly fed reluctance machines for large pumps and wind turbines," IEEE Trans. Ind Appl., vol. 38, No. 6, pp. 1508-1516, Nov./Dec. 2002.

Ming Cheng, Peng Han, Wei Hua, "A General airgap field modulation theory for electrical machines," IEEE Trans. Ind. Electron., vol. 64, No. 8, pp. 6063-6074, Aug. 2017.

Longya Xu, Li Zhen, Eel-Hwan Kim, "Field-orientation control of a doubly excited brushless reluctance machine," IEEE Trans. Ind Appl., vol. 34, No. 1, pp. 148-155, Jan./Feb. 1998.

Paul Gemin, Tom Kupiszewski, Arthur Radun, Yan Pan, Rixin Lai, Di Zhang, Ruxi Wang, Xinhui Wu, Yan Jiang, Steve Galioto, Kiruba Haran, William Premerlani, Jim Bray, Antonio Caiafa, "Architecture, voltage and components for a turboelectric distributed propulsion electric grid (AVC-TeDP)," Jul. 2015. 122 pages.

Catherine E. Jones, Patrick J. Norman, Stuart J. Galloway, Michael J. Armstrong, Andrew M. Bollman, "Comparison of candidate architectures for future distributed propulsion aircraft," IEEE Trans. Appl. Supercond., vol. 26, No. 6, Sep. 2016, 9 pages.

David J. Sadey, Marc Bodson, Jeffrey T. Csank, Keith R. Hunker, Casey J. Theman, Linda M. Taylor, "Control demonstration of multiple doubly-fed induction motors for hybrid electric propulsion," 53rd AIAA/SAE/ASEE Joint Propulsion Conference, Atlanta, GA, Jul. 2017. 13 pages.

David J. Sadey, Linda M. Taylor, Raymond F. Beach, "Proposal and development of a high voltage variable frequency alternating current power system for hybrid electric aircraft," 14th International Energy Conversion Engineering Conference, Salt Lake City, UT, Jul. 2016. 10 pages.

S. Williamson, A. C. Ferreira, A. K. Wallace, "Generalised theory of the brushless doubly-fed machine. Part 1: Analysis," IET Electr. Power Appl., vol. 144, No. 2, pp. 111-122, 1997.

Andrew M. Knight, Robert E. Betz, David G. Dorrell, "Design and analysis of brushless doubly fed reluctance machines," IEEE Trans. Ind. Appl., vol. 49, No. 1, pp. 50-58, Jan./Feb. 2013.

Sul Ademi, Milutin G. Jovanovic, "Vector control methods for brushless doubly fed reluctance machines," IEEE Trans. Ind. Electron., vol. 62, No. 1, pp. 96-104, Jan. 2015.

Yi Liu, Wu Ai, Bing Chen, Ke Chen, Guang Luo, "Control design and experimental verification of the brushless doubly-fed machine for stand-alone power generation applications," IET Electr. Power Appl., vol. 10, No. 1, pp. 25-35, Jan. 2016.

* cited by examiner (prior art)

INDEPENDENT SPEED VARIABLE FREQUENCY GENERATOR FOR MORE ELECTRIC AIRCRAFT USING BRUSHLESS DOUBLY-FED MACHINES (BDFM)

CROSS-REFERENCE TO RELATED APPLICATIONS

This application claims the benefit of U.S. provisional patent application No. 62/991,683, filed on Mar. 19, 2020, and entitled "INDEPENDENT SPEED VARIABLE FREQUENCY GENERATOR FOR MORE ELECTRIC AIRCRAFT USING BRUSHLESS DOUBLY-FED MACHINES (BDFM)," the disclosure of which is expressly incorporated herein by reference in its entirety.

BACKGROUND

The existing concept of aviation turboelectric distributed propulsion for passenger aircraft relies on direct current (DC) for power transmission and distribution. The mass and efficiency performance of DC-based propulsion systems becomes challenging as the system power rating increases.

Tremendous efforts have been taken towards the more electric aircraft (MEA) over the past few decades. Technological advances of aircraft electrification are making each flight more efficient and eco-friendly. A most recent symbolic innovation of MEA is the replacement of traditional pneumatic power by electrical power on the Boeing 787.

The N+X plan is guiding the development of future MEA targeting a 71-dB reduction of noise, an 80% decrease of NOx emissions, and 60% less fuel consumption by 2035. This plan essentially involves a high-power electric drive system in aviation propulsion. Various aviation propulsion architectures have been proposed, including all-electric, hybrid electric, and turboelectric propulsion. An all-electric or a hybrid electric aircraft heavily relies on an onboard energy storage system. While the power density of the existing energy storage system is not high enough to fully decarbonize a single-aisle passenger aircraft, the turboelectric distributed propulsion (TeDP) is believed to be a better solution considering feasibility and reliability.

In turboelectric configurations, the mechanical power of the gas turbines is converted to electrical power by generators and then delivered to propulsive motors to drive propellers. The total power rating of a propulsion system for a passenger aircraft can be up to 50 MW. The selection of the propulsion configuration will significantly impact the mass and efficiency of the system.

Figure 1:
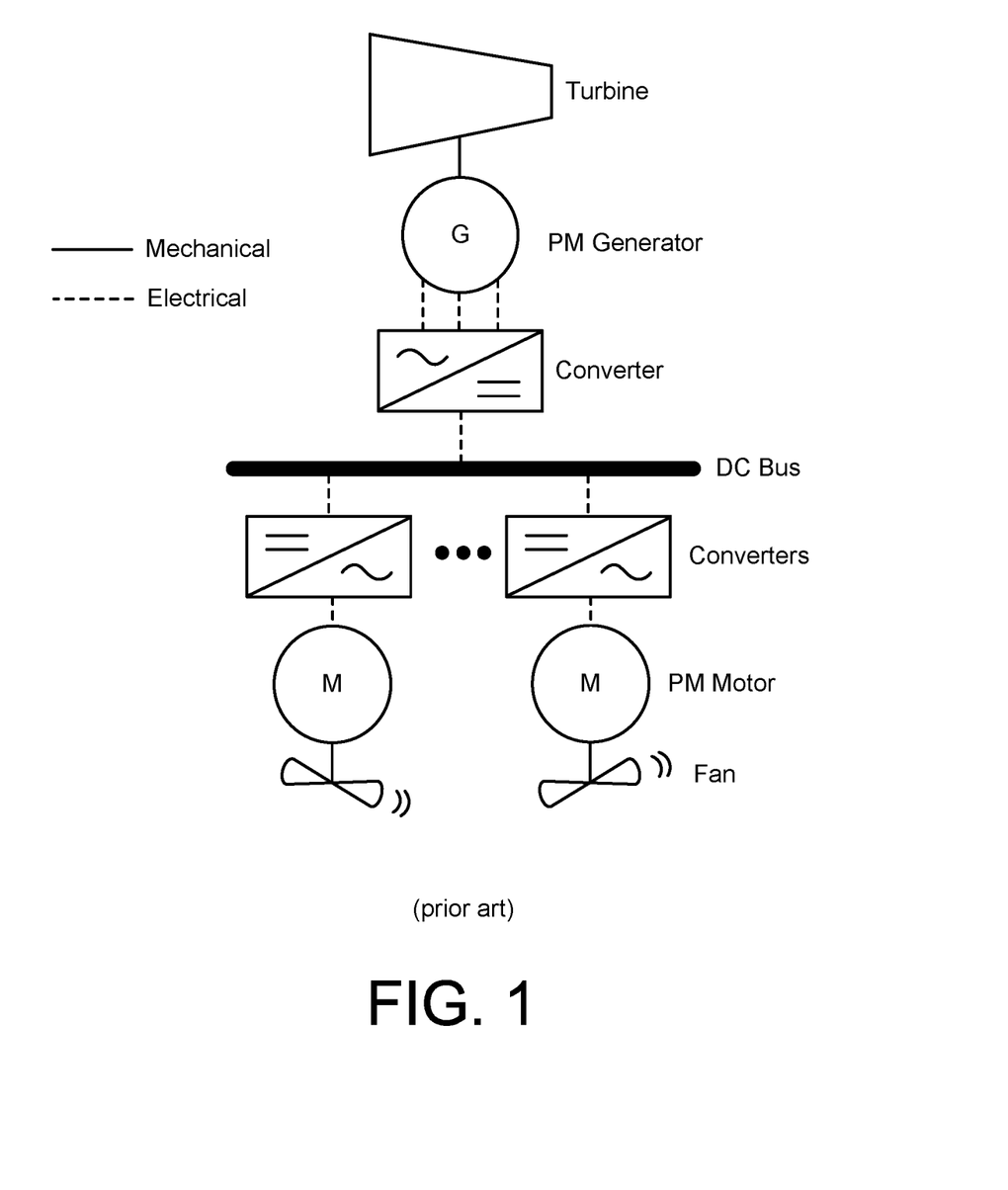
FIG. 1 (prior art) is an illustration of a DC-based TeDP with permanent magnet machines and full power rated converters.

FIG. 1 is an illustration of a DC-based TeDP with permanent magnet machines and full power rated converters. A DC-based TeDP has one or more DC buses between the generators and motors, as shown in FIG. 1. A DC-based TeDP requires multiple full power rated converters to transmit the power between alternating current (AC) and DC. It is found that more than 50% of the mass of a DC-based TeDP comes from the converters and protections. As the system voltage level goes up, the overall mass increases, and total system efficiency drops.

A TeDP system based on doubly-fed induction machines (DFIMs) is proposed to achieve minimal power conversion and variable speed operation. A DFIM only needs a converter at the rotor winding side to take the slip power of the machine. The stator winding is directly connected to an AC bus. The overall weight and size of power conversion components are reduced. However, a slip ring is required to connect the winding on the rotating rotor for variable speed operation. Therefore, DFIM-based TeDP could be mechanically unstable, considering long-term high-speed operation.

It is with respect to these and other considerations that the various aspects and embodiments of the present disclosure are presented.

SUMMARY

A turboelectric distributed propulsion based on brushless doubly-fed machines (BDFMs) is provided, which minimizes power conversion, enhances mechanical reliability, and strengthens fault-tolerance capability of a DC-based propulsion system. A turboelectric distributed propulsion (TeDP) architecture using BDFMs for aviation applications, and a designed BDFM, inverter, and controller are provided. Simulations and systems are also provided.

In an implementation, a turboelectric distributed propulsion (TeDP) system comprises: an engine; a generator comprising a plurality of control windings and a plurality of power windings, wherein the generator is driven by the engine; a plurality of motors, wherein the power windings of the generator are directly connected to power windings of the motors; and a plurality of bidirectional converters, wherein the control windings of the generator and the motors are individually controlled by a respective one of the bidirectional converters.

In an implementation, a turboelectric distributed propulsion (TeDP) system comprises: a first brushless doubly-fed machine (BDFM); and a second BDFM, wherein the first BDFM is configured as a generator, and the second BDFM is configured as a motor.

In an implementation, a turboelectric distributed propulsion (TeDP) comprises a plurality of brushless doubly-fed machines (BDFMs) configured for use with an aviation application.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Brushless doubly-fed machines (BDFMs) share the same advantage as DFIMs, i.e., a reduced power rating of converters. In comparison, the mechanical performance of BDFMs is more robust than DFIMs, as there is not a slip ring at the rotor side. This makes BDFMs a candidate for aviation propulsion applications.

A TeDP based on BDFMs is described herein.

Figure 2:
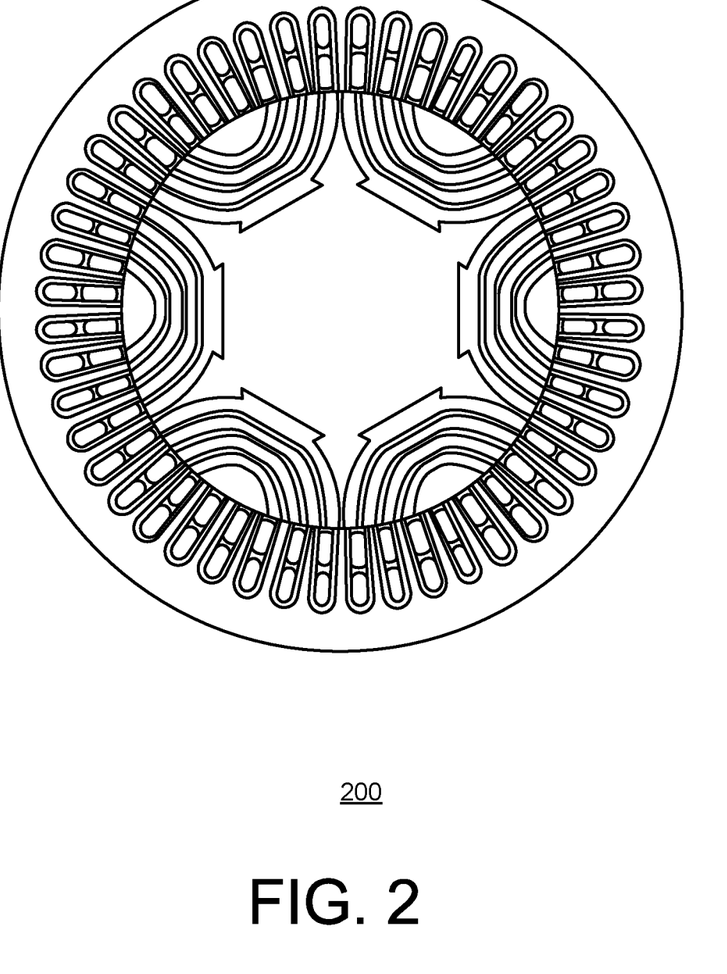
FIG. 2 is a cross-section of an implementation of a high-speed BDFM.

This work is based on a high-speed BDFM 200 shown in FIG. 2. FIG. 2 is a cross-section of a designed high-speed BDFM 200. Its basic parameters are listed in Table I. The BDFM 200 has an 8-pole winding and a 4-pole winding on the stator. The winding fed by the converter is called the control winding (CW). The other winding directly connects the AC bus and can be termed power winding (PW). The rotor has 6 poles. Each pole consists of 4 pieces of flux guides.

TABLE I

| BDFM Characteristics | |
|---|---|
| Rated Speed | 12,000 rpm |
| Rated Power | 120 kW |
| DC Bus Voltage | 540 V |
| Peak Efficiency | 96% |
| PW Self-inductance | 250 uH |
| CW Self-inductance | 400 uH |
| Mutual Inductance | 220 uH |
| PW Resistance | 7.6 mΩ |
| CW Resistance | 9.1 mΩ |

The pole combination follows (1), where $p_r$, $p_p$, and $p_c$ are the pole numbers of the rotor, PW, and CW. The frequency follows (2), in which $\omega_{re}$ is the rotor electrical speed, $\omega_{rm}$ the rotor mechanical speed, $\omega_P$ and $\omega_C$ the electrical speed of the PW and CW, respectively.

$$p_r = \frac{p_P \pm p_C}{2} \quad (1)$$

$$\omega_{re} = \omega_{rm} p_r = \omega_P \pm \omega_C \quad (2)$$

The mathematical model of a BDFM is similar to a DFIM. But the operating principles are significantly different. The two windings of a DFIM have the same pole number. The magnetic fields generated by the two windings can be directly coupled in the airgap. However, in a BDFM, the windings have different pole numbers. The coupling of two magnetic fields is achieved by the field modulation with the help of the rotor.

A BDFM operates in natural-synchronous mode if the rotor frequency equals the PW frequency. Depending on the difference between the rotor frequency and PW frequency, a BDFM works in super-synchronous mode or in sub-synchronous mode. The CW excitation compensates for this frequency difference according to (2). As a result, the rotor frequency can be independent of the winding frequencies. In contrast, the rotor speed of a traditional singly-fed machine is fixed given a stator winding frequency.

The mechanical power of a BDFM equals the sum of the electrical power through the PW and CW.

$$P_{mech} = P_P + P_C \quad (3)$$

where $P_{mech}$ is the mechanical power, $P_P$ the PW electrical power, and $P_C$ the CW electrical power.

In a BDFM, the frequency ratio approximately equals the active power ratio, as given in (4). This relationship can quickly help estimate the amount of electrical and mechanical power. The CW is supposed to operate at a frequency much lower than the PW frequency to lower the power carried by the converter.

$$\frac{f_C}{f_P} \approx \frac{P_C}{P_P} \quad (4)$$

Figure 3:
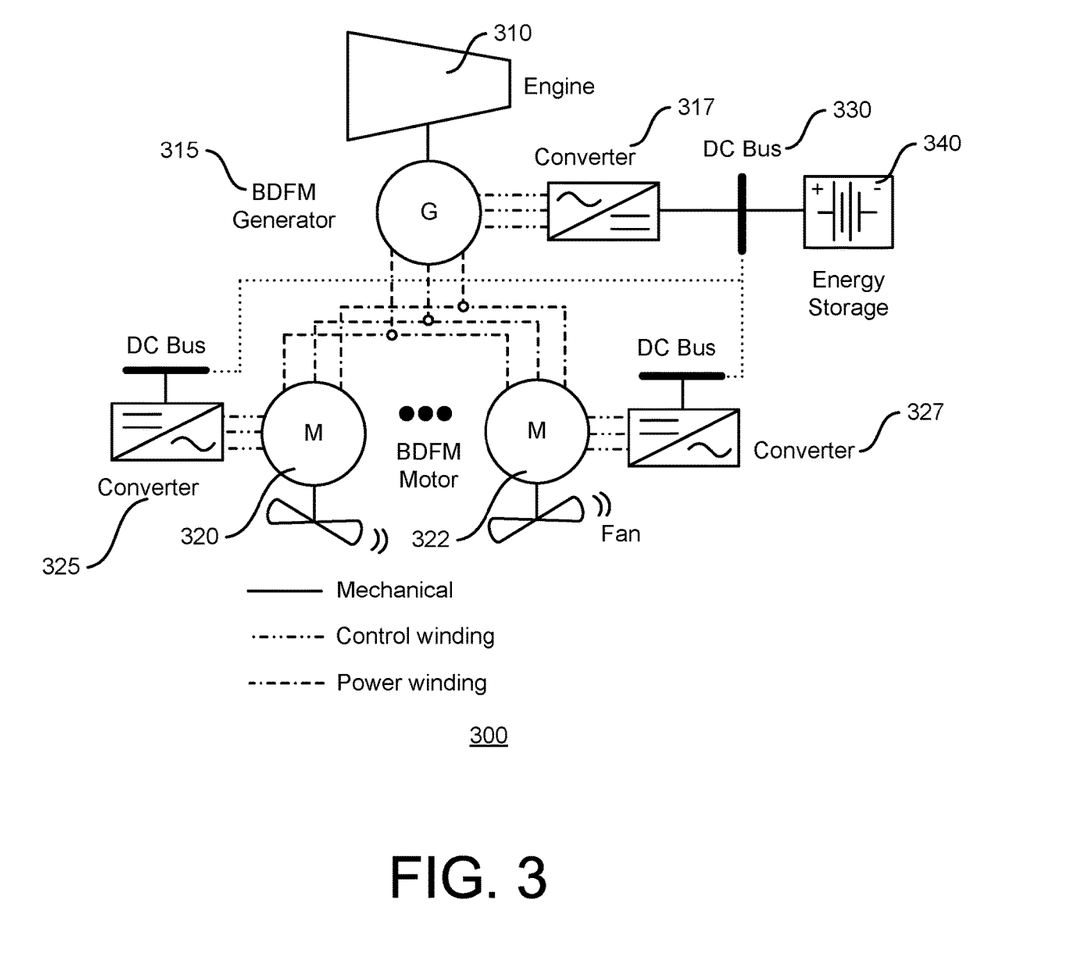
FIG. 3 is a diagram of an implementation of a BDFM-based TeDP.

FIG. 3 is a diagram of an implementation of a BDFM-based TeDP 300. In the TeDP 300 system, as seen in FIG. 3, the engine 310 drives the generator 315. The mechanical power is converted to three-phase electrical power in the two stator windings of the generator 315. The PWs of the generator 315 are directly connected to the PWs of the motors 320, 322 via an alternating current (AC) bus. The CWs of the generator 315 and motors 320, 322 are individually controlled by bidirectional converters 317, 325, 327, respectively. The converters 317, 325, 327 have a common DC bus 330. It can be a DC bus 330 fed by an energy storage system 340 if it is a hybrid TeDP, or a DC bus of a back-to-back converter, which takes the generator PW as the primary AC power source if it is a regular TeDP. As an example, the DC bus is assumed to be steady at 540 VDC, with neither an energy storage system nor a back-to-back converter considered.

The proposed BDFM-based TeDP shows advantages over other TeDP architectures: (1) The mass of the power conversion is significantly minimized as most power is transmitted through the PW and AC bus. The CW converter is downscaled because it only takes a fraction of the machine power; (2) The system is mechanically robust due to the absence of magnets, windings, and slip ring at the rotor side; and (3) The system is safe as it can be immediately de-energized by actively cutting off the CW excitations in fault conditions.

Figure 4:
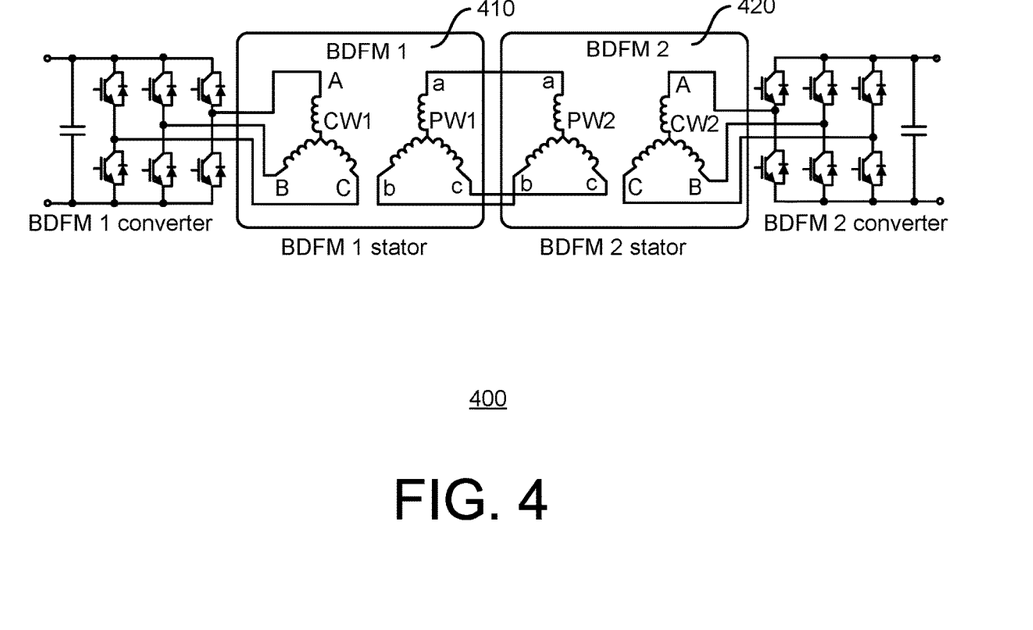
FIG. 4 is a diagram of an implementation of an example TeDP system comprising one stand-alone generator and one propulsive motor.

FIG. 4 is a diagram of an implementation of a TeDP system 400 comprising one stand-alone generator 410 and one propulsive motor 420. A TeDP consisting of one generator and one motor, as shown in FIG. 4, is taken as an example to illustrate the system modeling and control method. In such a TeDP, the generator 410 (BDFM 1) converts the engine mechanical power to electrical power and is built as a stand-alone generator. The motor 420 converts electrical power to mechanical power and is modeled as a propulsive motor.

With respect to TeDP system modeling, the dq-axis voltage and flux linkage of a BDFM in a general reference frame g can be expressed as follows:

$$v_{pd} = r_p i_{pd} + \frac{d}{dt}\lambda_{pd} - \omega_g \lambda_{pq} \quad (5)$$

$$v_{pq} = r_p i_{pq} + \frac{d}{dt}\lambda_{pq} + \omega_g \lambda_{pd} \quad (6)$$

$$v_{cd} = r_c i_{cd} + \frac{d}{dt}\lambda_{cd} - (\omega_{re} - \omega_g)\lambda_{cq} \quad (7)$$

$$v_{cq} = r_c i_{cq} + \frac{d}{dt}\lambda_{cq} + (\omega_{re} - \omega_g)\lambda_{cd} \quad (8)$$

where v is the voltage, i the current, λ the flux linkage, r the winding resistance, $\omega_{re}$ the rotor electrical speed, $\omega_g$ the electrical speed of the general reference frame, pd, pq, cd, and cq the dq-axes of the PW and CW.

$$\lambda_{pd} = l_p i_{pd} + l_m i_{cd} \quad (9)$$

$$\lambda_{pq} = l_p i_{pq} - l_m i_{cq} \quad (10)$$

$$\lambda_{cd} = l_c i_{cd} + l_m i_{pd} \quad (11)$$

$$\lambda_{cq} = l_c i_{cq} - l_m i_{pq} \quad (12)$$

where $l_p$ is the PW self-inductance, $l_c$ the CW self-inductance, $l_m$ the mutual inductance.

In a multi-BDFM TeDP system, the terminal voltage of each PW is the same (i.e., is equal). The PW current vector of the generator is opposite to the sum of PW current vectors of the motors (BDFM 2, 3, . . . , n). This implies that the generator PW delivers power to the motors, and the motor PWs consume the power from the generator.

$$v_{1p}^g = v_{2p}^g = \ldots = v_{np}^g \quad (13)$$

$$i_{1p}^g = -(i_{2p}^g + \ldots + i_{np}^g) \quad (14)$$

where v and i are the voltage and current vectors, and n denotes the n-th BDFM.

Figure 5:
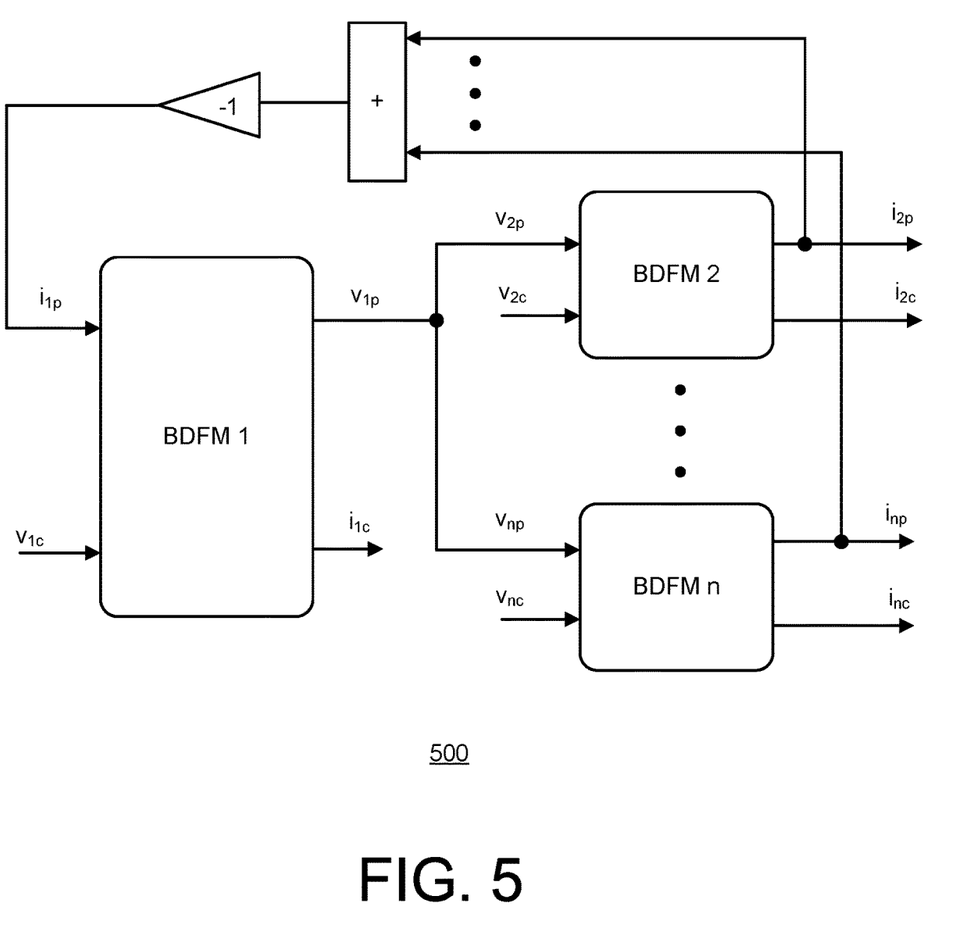
FIG. 5 is an illustration of inputs, outputs, and interfaces of the modeling of an implementation of a BDFM-based TeDP system.

The inputs, outputs, and interfaces of a BDFM-based TeDP 500 are illustrated in FIG. 5. FIG. 5 is an illustration of inputs, outputs, and interfaces of the modeling of a BDFM-based TeDP system. The individual machine model is built in the blocks. The CWs of all the machines have voltage as input and current as output. The PW of BDFM 1 takes the opposite of the sum of motor PW currents as input. Then the terminal voltage $v_{1p}$ is calculated as the input of the PWs of motors. This modeling method allows for an extension to large propulsion systems with multiple propulsive motors.

A dynamic torque expression of TeDP is described.

For grid-tied power generation and electric drive applications, BDFMs typically rely on field-oriented control (FOC) to achieve active/reactive power control and speed control. FOC selects the PW flux $\lambda_p$ as the reference frame and locks the d-axis to $\lambda_p$. Then the q-axis flux of PW is always 0. As a result, the machine torque becomes linearly dependent on the q-axis current of CW. However, FOC is not an optimal solution for aviation propulsion application because: (1) The FOC requires the measurement of PW voltage and current to calculate the orientation of the PW flux linkage. Each motor needs a pair of voltage and current sensors, which increases the cost and computational load, and undermines the overall reliability; (2) The PWM voltages injected into the CWs can easily transfer to the PW. Therefore, severe harmonics exist in the PW voltage. The harmonics would cause inaccuracy in the calculation of flux orientation; and (3) The FOC is sensitive to machine parameters and could be inaccurate in the condition of saturation.

A new dynamic torque expression of the TeDP is derived. The control algorithm of the TeDP can be significantly simplified based on the torque expression. Considering the TeDP in FIG. 4, the classic torque expression of BDFM 1 in dq-axis form is known as:

$$T_{e1} = 3/2 p_r (\lambda_{1pd} i_{1pq} - \lambda_{1pq} i_{1pd}) \quad (15)$$

where $T_{e1}$ is the electromagnetic torque of BDFM 1.

$T_{e1}$ can be expressed as the magnitude of the cross product of the PW flux vector and the PW current vector in the general reference frame g:

$$T_{e1} = 3/2 p_r |\lambda_{1p}^g \times i_{1p}^g| \quad (16)$$

Given that the PW terminal voltages are the same, and ignoring the voltage drop on the resistance, the flux vectors of each PW are the same.

$$\lambda_{1p}^g = \lambda_{2p}^g = \ldots \lambda_{np}^g \quad (17)$$

It can be shown that the torques of the two BDFMs are the same in magnitude but have different signs.

$$T_{e2} = -T_{e1} = \frac{3}{2} p_r |\lambda_{2p}^g \times i_{2p}^g| = -\frac{3}{2} p_r |\lambda_{2p}^g \times i_{1p}^g| \quad (18)$$

According to (9) and (10), the PW flux vector of BDFM 2 can be written as:

$$\lambda_{2p}^g = l_{2p} i_{2p}^g + l_{2m} i_{2c}^{g*} \quad (19)$$

or (20) given (14):

$$\lambda_{2p}^g = -l_{2p} i_{1p}^g + l_{2m} i_{2c}^{g*} \quad (20)$$

where $i_{2c}^{g*}$ is the complex conjugate of the CW current space vector of BDFM 2.

The torque expression of BDFM 1 can be written as:

$$T_{e1} = \frac{3}{2} p_r |\lambda_{2p}^g + i_{1p}^g| \quad (21)$$

$$= \frac{3}{2} p_r |(-l_{2p} i_{1p}^g + l_{2m} i_{2c}^{g*}) \times i_{1p}^g|$$

$$= \frac{3}{2} p_r l_{2m} |i_{2c}^{g*} \times i_{1p}^g|$$

Because the PW flux linkage vectors of two BDFMs are the same given (17), (22) is obtained.

$$l_{1p} i_{1p}^g + l_{1m} i_{1c}^{g*} = l_{2p} i_{2p}^g + l_{2m} i_{2c}^{g*} \quad (22)$$

A further derivation shows that the PW current vector of BDFM 1 can be expressed as (23).

$$i_{1p}^g = \frac{l_{2m} i_{2c}^{g*} - l_{1m} i_{1c}^{g*}}{l_{1p} + l_{2p}} \quad (23)$$

Then (21) can be written as (24), in which the torque of the generator becomes a function of the mutual inductance, PW self-inductance, and the CW currents of the two BDFMs.

$$T_{e1} = \frac{3}{2} p_r l_{2m} \left| i_{2c}^{g*} \times \frac{l_{2m} i_{2c}^{g*} - l_{1m} i_{1c}^{g*}}{l_{1p} + l_{2p}} \right| \quad (24)$$
$$= -\frac{3}{2} p_r \frac{l_{1m} l_{2m}}{l_{1p} + l_{2p}} |i_{2c}^{g*} \times i_{1c}^{g*}|$$

Converting the space vector form to the dq-axis form, the torque of BDFM 1 can be written as follows:

$$T_{e1} = \frac{3}{2} p_r \frac{l_{1m} l_{2m}}{l_{1p} + l_{2p}} (i_{2cd} i_{1cq} - i_{2cq} i_{1cd}) \quad (25)$$

The above expression is useful for control purposes involving the dq currents of the CWs of the BDFM 1 and 2. If the reference frame is aligned with the CW current vector of BDFM 1, there will not be any q-axis current component. In such a manner, the expression can be simplified as:

$$T_{e1} = -\frac{3}{2} p_r \frac{l_{1m} l_{2m}}{l_{1p} + l_{2p}} i_{1cd} i_{2cq} \quad (26)$$

$T_{e1}$ is the torque of the generator, which is negative. This can be achieved by applying a positive $i_{2cq}$. This implies that the torque of the TeDP system can be controlled by the d-axis CW current of BDFM 1 (generator) and q-axis CW current of BDFM 2 (motor). In other words, when the motor CW current and the generator CW current is 90-degrees apart, the torque of the TeDP system can be maximized.

A similar torque expression of BDFM 1 in a TeDP with one generator and two motors can be derived based on the same idea, as shown in (27). The torque of the generator is opposite to the sum of the torque of each motor.

$$T_{e1} = -\frac{3}{2} p_r \left( \frac{l_{1m} l_{2m}}{l_{1p} + l_{2p}} i_{1cd} i_{2cq} + \frac{l_{1m} l_{3m}}{2 l_{1p} + l_{3p}} i_{1cd} i_{3cq} \right) \quad (27)$$

The above derivation has been verified by the TeDP mathematical model and an FEA-circuit co-simulation. A further investigation reveals that the equation holds regardless of the initial rotor positions of the machines. However, encoders are still needed for system control.

Figure 6:
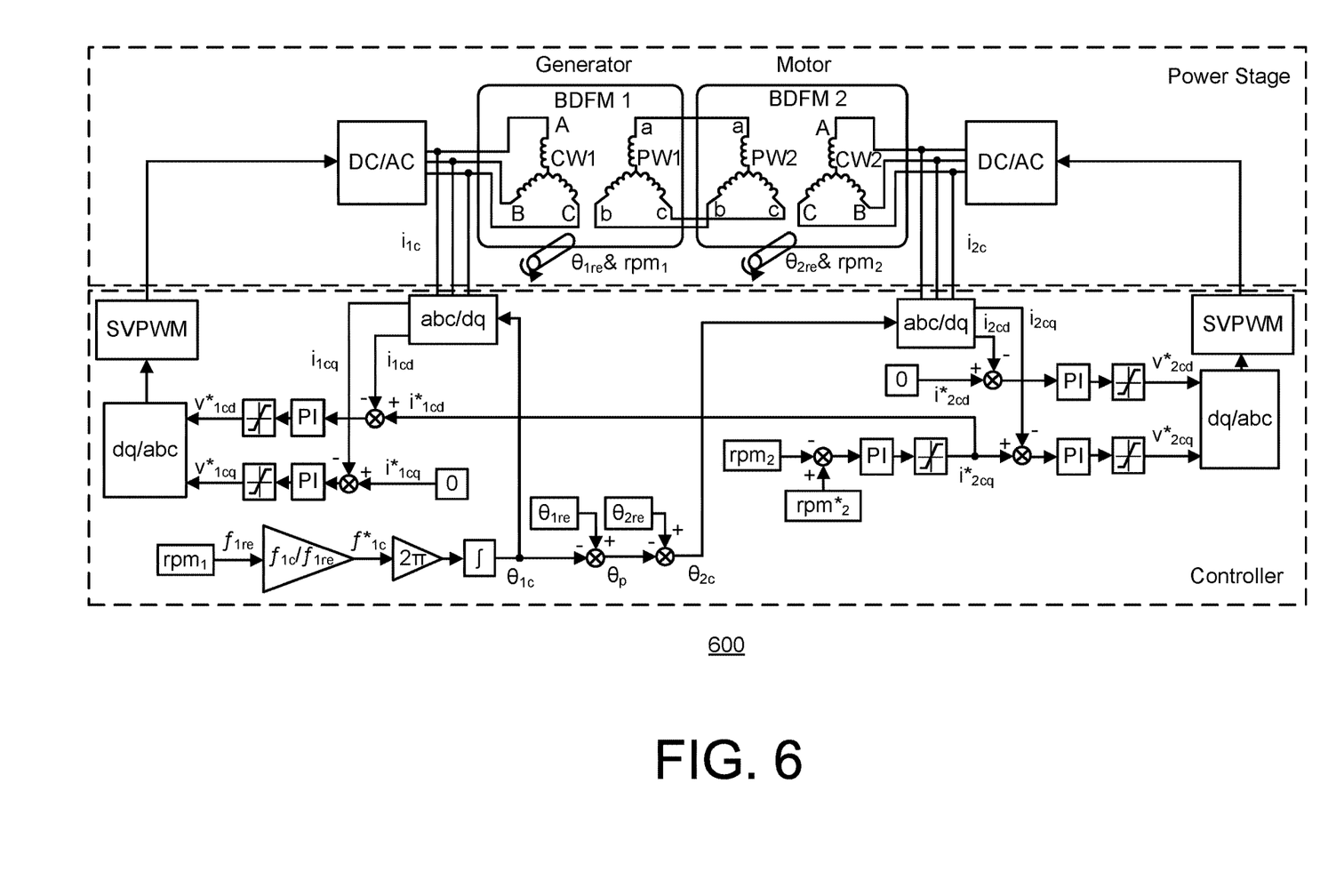
FIG. 6 is a control diagram of an example TeDP (one generator+one motor) in propulsion mode.

In propulsion mode, the system operates BDFM 1 as the generator and BDFM 2 as a motor. The control diagram of the same TeDP 600 is illustrated in FIG. 6. FIG. 6 is a control diagram of a TeDP 600 (one generator+one motor) in propulsion mode.

It is known that the active power ratio approximately equals the frequency ratio, and the CW is supposed to carry a small portion of the total machine power. Therefore, the CW frequency command of BDFM 1, f*$_{1c}$ can be obtained by multiplying the rotor frequency $f_{1re}$ by a factor of f*$_{1c}$/f$_{1re}$. Theoretically, $f_{1c}$ can be commanded as 0 Hz at low speeds unless the PW frequency is too high or a wide-range variable speed is needed.

Once $f_{1c}$ is known, the angular position of BDFM 1 CW, $\theta_{1c}$ is obtained. Because the PW frequency of both machines is the same, the angular position of BDFM 2 CW, $\theta_{2c}$ can be calculated using:

$$\theta_{2c} = \theta_{2re} - (\theta_{1re} - \theta_{1c}) \quad (28)$$

The motor operates in speed mode. A PI controller of the speed control loop keeps the motor speed on track by outputting CW current commands, i*$_{1d}$ of BDFM 1 and i*$_{1q}$ of BDFM 2. According to (26), the CW currents of both machines determine the torque level and, therefore, the amount of active power that can be extracted from the engine.

The TeDP system has the capability of self-starting. In self-start mode, the system functions in reverse compared to the propulsion mode. The generator operates as a motor to drive the turbo engine to a certain speed level until the engine can work by itself. The motor is in generating mode. This can be achieved by commanding a CW current of BDFM 2 90-degree lagging the CW current of BDFM 1.

BDFM 2 does not have any mechanical power input, and its shaft speed is 0 rpm. To have PW 2 deliver power to the PW 1, CW 2 should be excited by a high-frequency current. The shaft of BDFM 2 should be fixed. In such a manner, the BDFM 2 can be considered as a transformer with CW 2 as the primary side and PW 2 the secondary side.

Figure 7:
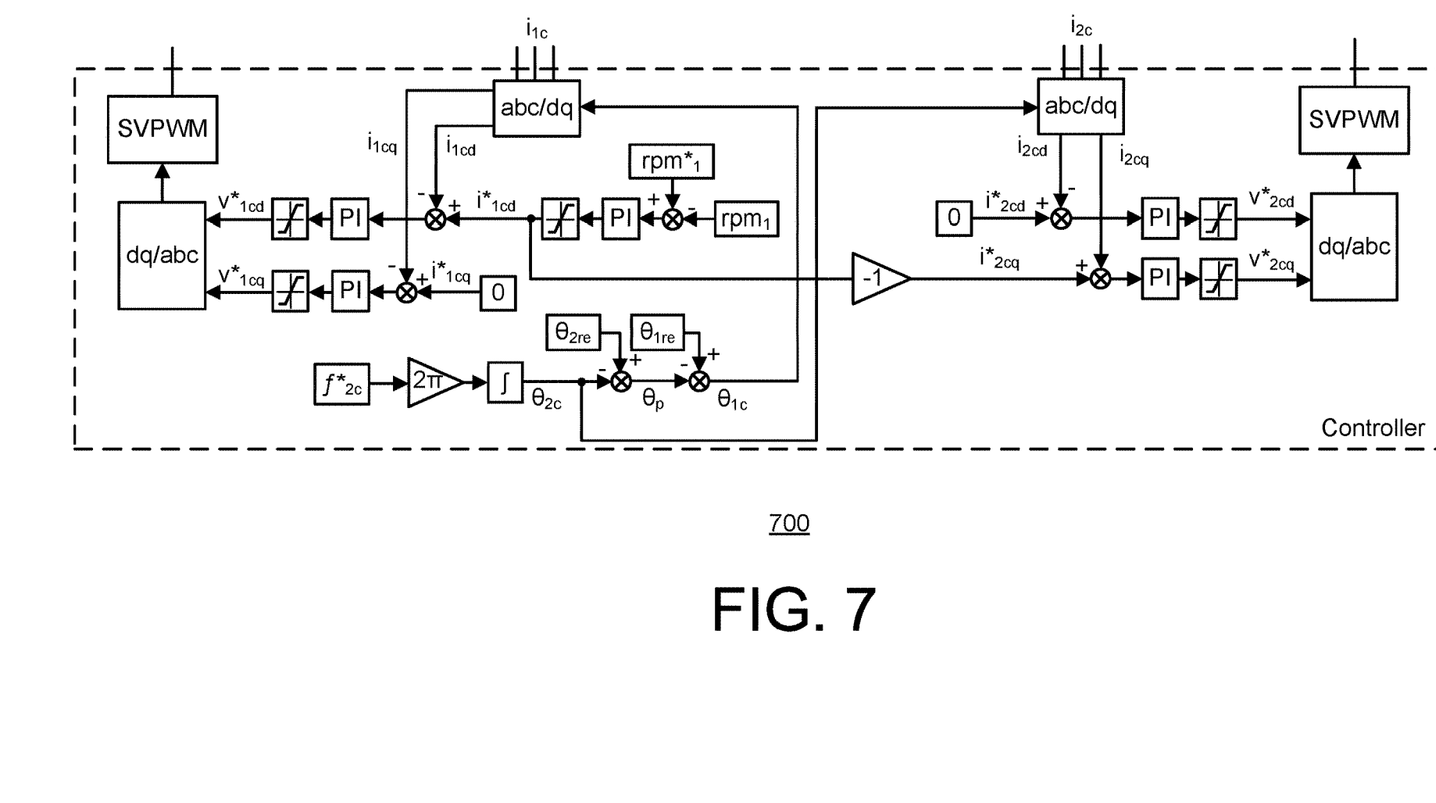
FIG. 7 is a control diagram of an example TeDP (one generator+one motor) in starting mode.

FIG. 7 is a control diagram of a TeDP 700 (one generator+ one motor) in starting mode. As shown in FIG. 7, a frequency command of CW 2, f*$_{2c}$ is firstly given. The angular position of each CW, $\theta_{1c}$ and $\theta_{2c}$ can be subsequently determined. BDFM 1 operates in speed mode. The output of the PI controller of the speed loop becomes the current command of CWs. A negative gain is needed to keep the current of CW 2 90-degree lagging the current of CW 1.

The control system can be easily expanded when more motors are added to the propulsion system. All the motor CWs can use the same angular position $\theta_{2c}$ keeping all the motor CW currents perpendicular to the generator CW current. The system control is significantly simplified because only CW currents and rotor positions are measured. One pair of voltage and current sensor is enough to monitor the PW for safety consideration.

Figure 8:
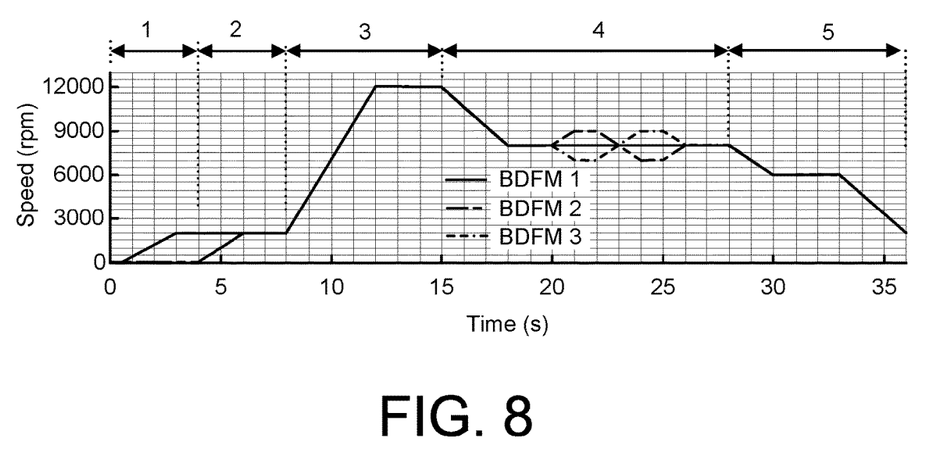
FIG. 8 shows the speed of BDFM 1, 2, 3 in an example TeDP in a simulation containing one generator (BDFM 1) and two motors (BDFM 2 and 3)
Figure 9:
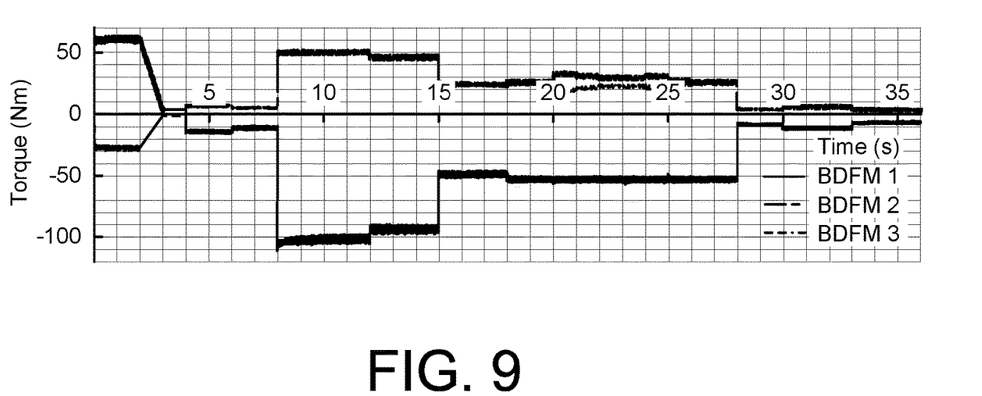
FIG. 9 shows the torque of BDFM 1, 2, 3.
Figure 10:
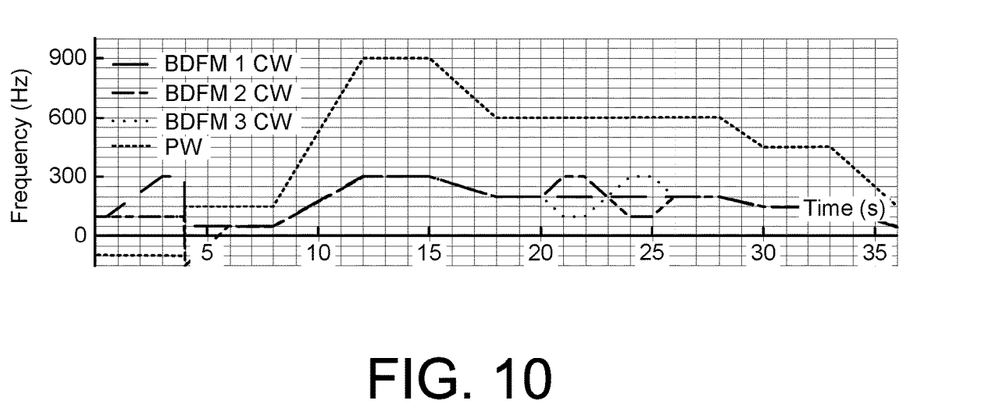
FIG. 10 shows the frequency of the control windings (CWs) of BDFM 1, 2, 3 and the PW.
Figure 11:
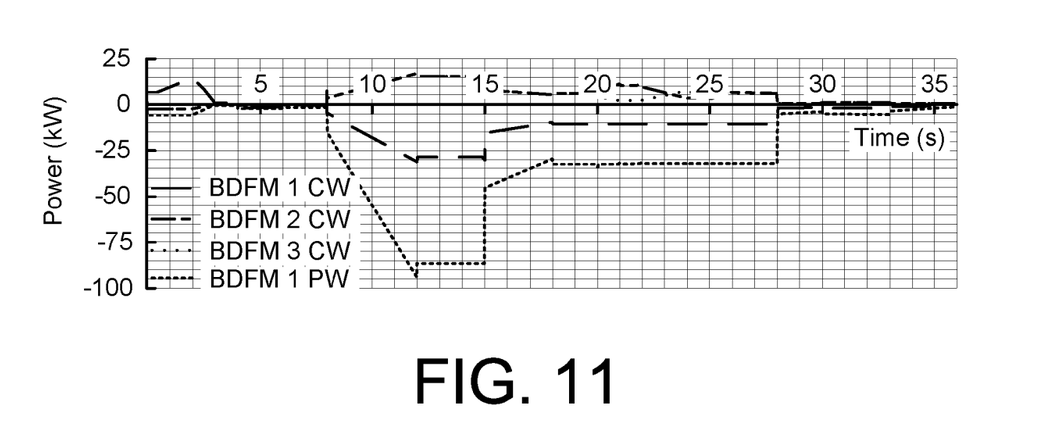
FIG. 11 shows the active power of CW of BDFM 1, 2, 3, and power winding (PW) of BDFM 1.
Figure 12:
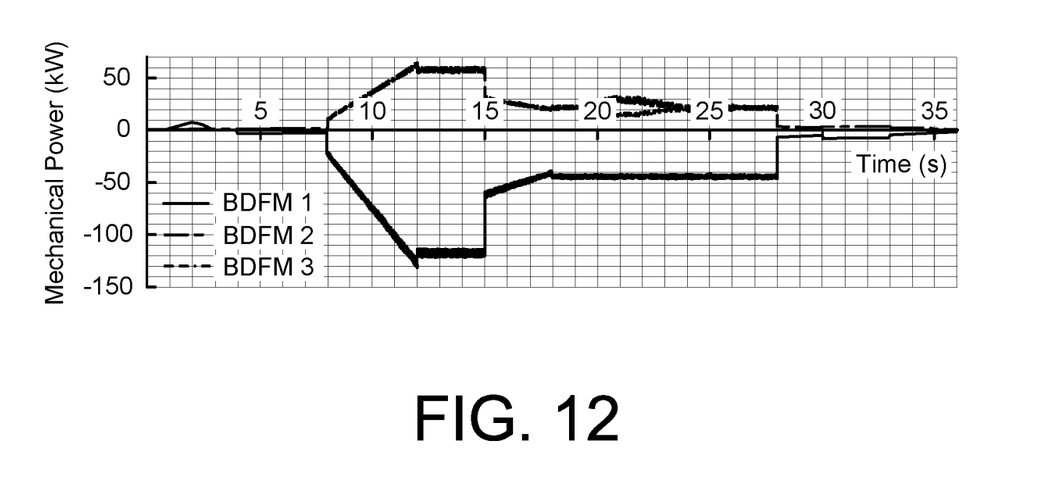
FIG. 12 shows the mechanical power of BDFM 1, 2, 3.
Figure 13:
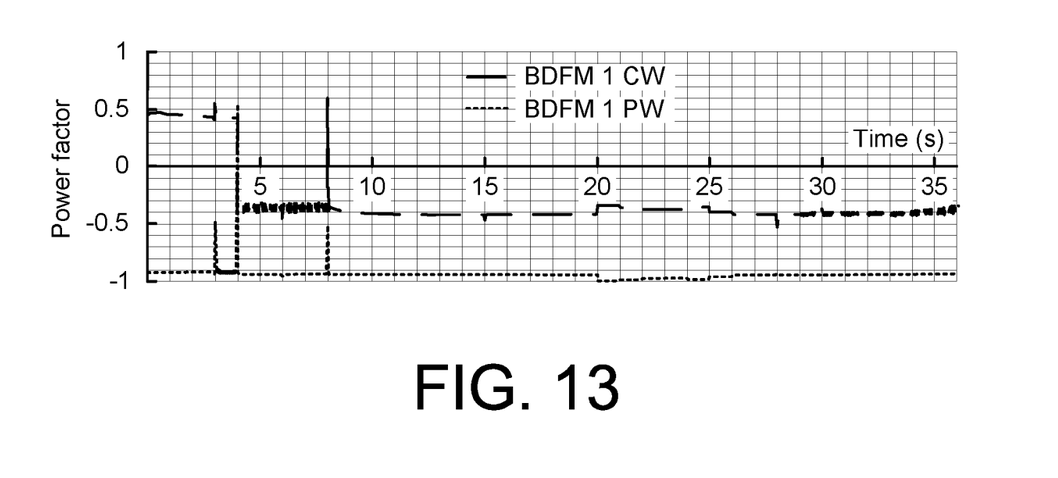
FIG. 13 shows the power factor of CW and PW of BDFM 1.
Figure 14:
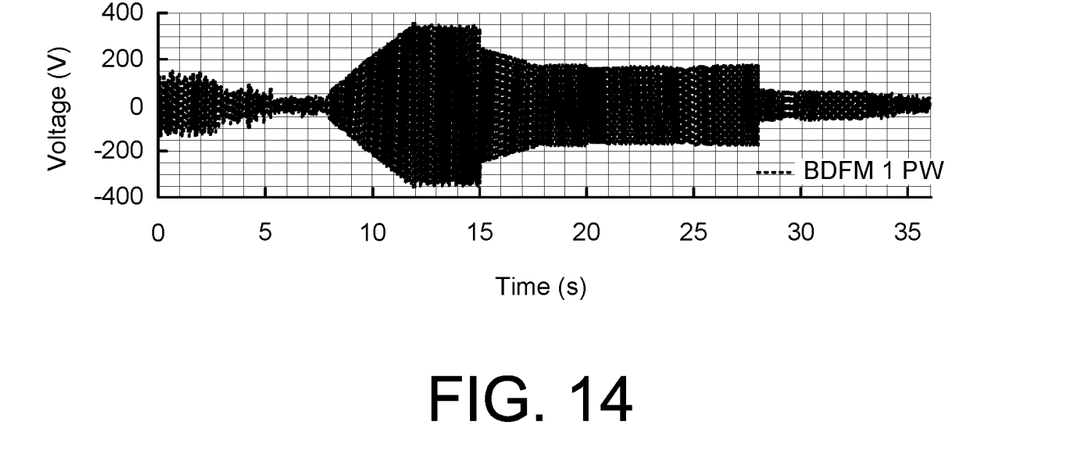
FIG. 14 shows the PW voltage of BDFM 1.
Figure 15:
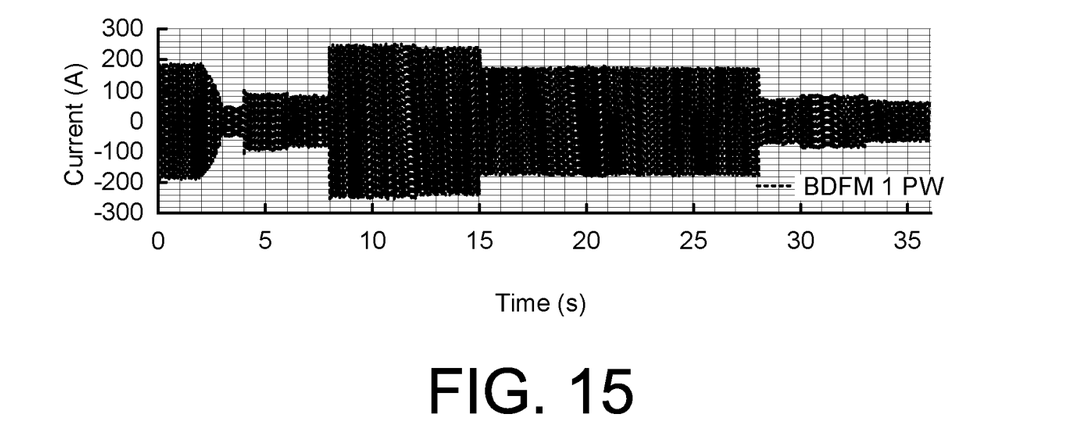
FIG. 15 shows the PW current of BDFM 1.
Figure 16:
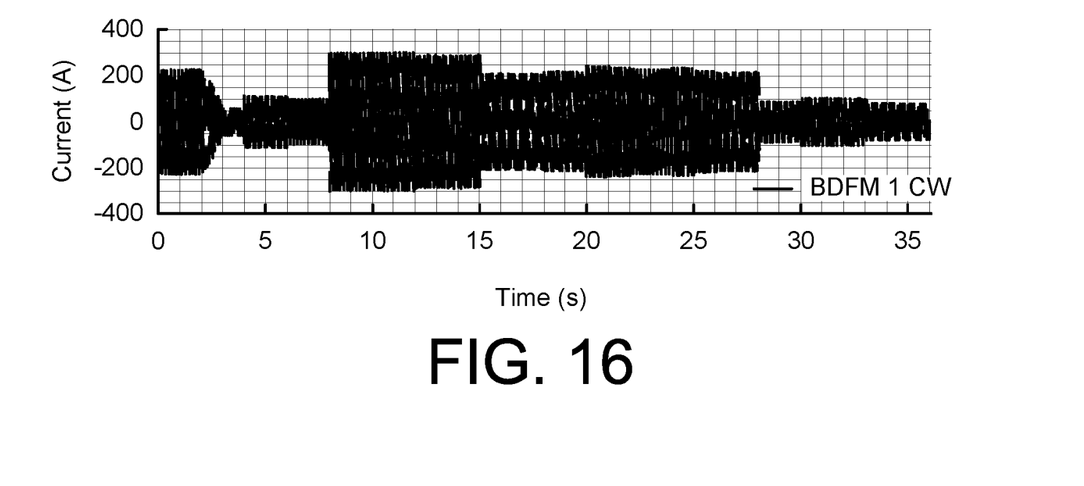
FIG. 16 shows the CW current of BDFM 1.

A simulation of a flight profile is described. A flight profile is simulated to demonstrate the capability of an implementation of a TeDP system described herein. The TeDP in the simulation contains one generator (BDFM 1) and two motors (BDFM 2 and 3). The flight profile lasts 36 seconds. FIG. 8 shows the speed of BDFM 1, 2, 3. FIG. 9 shows the torque of BDFM 1, 2, 3. FIG. 10 shows the frequency of the CWs of BDFM 1, 2, 3 and the PW. FIG. 11 shows the active power of CW of BDFM 1, 2, 3, and PW of BDFM 1. FIG. 12 shows the mechanical power of BDFM 1, 2, 3. FIG. 13 shows the power factor of CW and PW of BDFM 1. FIG. 14 shows the PW voltage of BDFM 1. FIG. 15 shows the PW current of BDFM 1. FIG. 16 shows the CW current of BDFM 1.

As marked in FIG. 8, the flight profile consists of 5 stages, i.e., 1. Startup, 0-4 s; 2. Taxiing, 4-8 s; 3. Taking-off and climbing, 8-15 s; 4. Cruising, 15-28 s; 5. Descending and landing, 28-36 s. The following data are recorded: FIG. 8, machine speed; FIG. 9, machine torque;

FIG. 10, frequency of CWs and PW; FIG. 11, mechanical power of the machines; FIG. 12, the active power of the CWs and PW; and FIG. 13, the power factor of BDFM 1 CW and PW. The voltage and current of BDFM 1 PW, and current of BDFM 1 CW are given as additional information in FIGS. 14, 15, and 16.

More particularly, in starting mode, a large load, i.e., the engine inertia and friction is applied to the generator. The generator provides a positive torque while the motors have negative torque. The CWs of BDFM 2 and 3 are both excited by 100 Hz currents to induce a −100 Hz excitation in the PW, given that the motors are at a standstill. The current amplitude and frequency of BDFM 1 CW are controlled to drive the engine to 2000 rpm.

The system switches to the propulsion mode in the 4th second. The generator is then driven by the engine. The two motors speed up to 2000 rpm with light load until the plane finishes taxiing at the 8th second. Starting from second 8, the plane takes off. The generator and motors accelerate to 12,000 rpm with a full load. It can be seen that the torque of the generator is twice that of each motor.

During the cruising stage, the speed of all machines reduces to 8,000 rpm. As known, the torque and speed requirements of each propulsive motor can be different. Therefore, a differential operation capability is considered to be necessary for an aircraft based on distributed propulsion. The differential operation is demonstrated between second 20 and 26. The generator speed keeps constant at 8000 rpm. The load of each motor is different. Each motor is able to follow an independent speed reference that is changing back and forth. During this differential operation, the frequency of the PW is constant. The variable-speed operation of motors is achieved by controlling the frequency of the CW of each motor. In the descending and landing stages, all machines decelerate with a light load until the speed goes back to 2000 rpm.

In the whole flight profile, the CW frequency of BDFM 1 is commanded as 25% of the rotor frequency. Therefore, the ratio between the rotor frequency to the CW frequency is 4, and the ratio between the PW frequency to the CW frequency is 3. The frequency ratio of 3 can be observed in FIG. 10. The frequency ratio approximately equals the active power ratio. As a result, the ratio of 3 can also be observed in FIG. 11 by comparing the PW active power and the CW active power. In the comparison of FIG. 11 and FIG. 12, the active power carried by the BDFM 1 CW is only 25% of the total generator mechanical power. So the power rating of the CW converter can be much lower compared to a DC-based TeDP system using traditional singly-fed machines.

The power factor of the windings, especially the CW, is of interest because a too low power factor would undermine the advantage of using BDFMs for electric propulsion. The power factor is calculated based on a low-pass filter, as shown in FIG. 13. The power factor of BDFM 1 CW and PW is negative because both windings are generating power. The spikes are caused by transients and are negligible. It can be seen that the generator PW power factor is close to −1. The PW power factor of generator and motors are symmetric about 0 because the PW voltages are the same, and the currents are 180-degree shifted.

The peak power factor of the BDFM 1 CW is −0.42, which is lower than traditional singly-fed machines. It is because of the large leakage inductance of the machine. The low CW power factor might be a limiting factor in using BDFMs for TeDP. Nevertheless, a CW power factor of 0.42 can still be competitive. Considering a DC-based TeDP using permanent magnet synchronous generator with a power rating of 1 in per-unit value and power factor of 0.85 in flux-weakening operation at high speed, the apparent power through the converter is 1.176. For a BDFM generator with the same power rating, the CW only takes up to 25% of the mechanical power, which is 0.25 in per-unit value. Given a power factor of 0.42, the power rating of the converter is 0.595. It is almost reduced by half compared to the converter of a permanent magnet generator. It is worth noting that the power factor can be improved from an electromagnetic design perspective. Other than that, the generator CW power factor increases as the load increases. A better CW power factor can be expected when more propulsive motors operate simultaneously.

The BDFM-based TeDP described herein has benefits of reduced size and rating of the power converter, robust mechanical performance, and high fault-tolerance capability compared to conventional TeDP concepts.

A mathematical model of the TeDP system is described to simulate the behavior of the proposed TeDP. The model can be expanded when more BDFMs join the system. A dynamic torque equation of the TeDP provided herein is derived based on the space vector theory. It is analyzed that the torque is a function of the CW currents of the generator and motors, and can be maximized when the CW current of the generator and CW currents of motors are 90-degrees apart.

Based on the derived torque equation, a control algorithm of the BDFM-based TeDP is described. The system control can be achieved by only measuring the CW currents and rotor positions. The control method is feasible for both the propulsion mode and the starting mode.

The capability of the proposed BDFM-based TeDP and the developed control method are verified using a simulation of a flight profile. The flight profile showcases the transition from the starting mode to the propulsion mode and demonstrates the differential operation of individual BDFM, which is one of the requirements of a TeDP. The CW power factor might become a limiting factor; however, it is still competitive in comparison with a DC-based TeDP.

Moreover, the proposed aircraft generation system using BDFMs has the following additional advantages over the state of the art: 1) one device provides the same functions as the state of the art 3-stage synchronous generator; 2) much simplified structure; 3) no electronics on the rotating parts; and 4) no need for rare earth materials.

In an implementation, three 120-kW BDFMs and three SiC-based two-level 75-kW three-phase inverters are designed and prototyped. Vector control and field-oriented control (FOC) are implemented to operate BDFMs in generating and motoring mode, respectively. A designed controller can fulfill the communication and control requirements of the TeDP system. The TeDP using BDFMs as described herein is a solution to aviation variable-frequency power generation and can be a potential candidate for future aviation propulsion.

An implementation of a 120-kW BDFM is provided. The BDFM has 8-pole PW in the outer two layers and 4-pole CW in the inner two layers. It has a 6-pole rotor with four pieces of flux guides on each pole. The rotor mechanical design takes advantage of a three-dimensional concept that allows a rotational speed up to 12,000 rpm while minimizing the flux leakage and enhancing the electromagnetic coupling between the two windings. The BDFM can provide 95-NM peak torque, 95% efficiency at 12,000-rpm rated speed. The mechanical capability has been verified by the over-speed test at 12,500 rpm.

The control winding of an implementation of a BDFM is fed by a SiC-based two-level 75-kW three-phase inverter. The input 540-V DC bus voltage is supplied by a bidirectional DC power supply. The fundamental frequency of the inverter (control winding) varies from 0 to 800 Hz corresponding to 0 to 12,000-rpm rotor speed.

A controller is designed for the control of the TeDP system. In a three-BDFM TeDP system, 6 PW voltages, 6 PW currents, and 6 CW currents are sampled and converted to digital signals at the sensor conditioning board. The digital signals and encoder (QEP) signals are transmitted through fiber optics and collected at the fiber optic board. The FPGA on the motherboard decodes and sends all digital signals to DSP through SPI (Serial Peripheral Interface). The control algorithm is implemented in the DSP. The reference voltage signals are output to the FPGA through UPP (Universal Parallel Port). 18 PWM signals are generated in the FPGA and then sent to the gate drives for machine operation. This controller has full capability of implementing sensing, ADC, communication, and machine control at 10K switching frequency for three-machine system, or over 20K switching frequency for single machine operation.

A BDFM in motoring mode is controlled using FOC, according to an implementation. FOC selects the PW winding flux $\lambda_{PW}$ as the reference frame and locks the d-axis to $\lambda_{PW}$. Then the q-axis flux of PW is always 0. As a result, the machine torque becomes linearly dependent on the q-axis current of CW. The stand-alone generator in a TeDP provides the desired power and PW frequency to the motors. The control of the generator is achieved by vector control. The active power sent to the motor through PW is controlled using q-axis current of generator CW. The reactive power is regulated by d-axis current of CW. The frequency of the PW can be stabilized by controlling the CW angular speed.

In an implementation, a turboelectric distributed propulsion (TeDP) system comprises: an engine; a generator comprising a plurality of control windings and a plurality of power windings, wherein the generator is driven by the engine; a plurality of motors, wherein the power windings of the generator are directly connected to power windings of the motors; and a plurality of bidirectional converters, wherein the control windings of the generator and the motors are individually controlled by a respective one of the bidirectional converters.

Implementations may include some or all of the following features. The plurality of bidirectional converters have a common direct current (DC) bus. The DC bus is fed by an energy storage system when it is a hybrid TeDP, or a DC bus of a back-to-back converter which takes the generator power windings as the primary AC power source when it is a regular TeDP. Mechanical power is converted to three-phase electrical power in stator windings of the generator. The power windings of the generator are directly connected to power windings of the motors via an alternative current (AC) bus.

In an implementation, a turboelectric distributed propulsion (TeDP) system comprises: a first brushless doubly-fed machine (BDFM); and a second BDFM, wherein the first BDFM is configured as a generator, and the second BDFM is configured as a motor.

Implementations may include some or all of the following features. The generator is a stand-alone generator and the second BDFM is a propulsive motor. Each of the BDFMs comprises a power winding and a control winding. A terminal voltage of each power winding is equal. When in self-start mode, the generator operates as a motor, and the motor operates in generating mode.

In an implementation, a turboelectric distributed propulsion (TeDP) comprises a plurality of brushless doubly-fed machines (BDFMs) configured for use with an aviation application.

Implementations may include some or all of the following features. The TeDP further comprises an inverter and a controller. The TeDP further comprises three 120-kW BDFMs and three SiC-based two-level 75-kW three-phase inverters. Each BDFM comprises an 8-pole power winding (PW) in the outer two layers and 4-pole control winding (CW) in the inner two layers, and a 6-pole rotor with four pieces of flux guides on each pole. Each BDFM is configured to allow a rotational speed up to 12,000 rpm while minimizing the flux leakage and enhancing the electromagnetic coupling between the two windings. Each BDFM is configured to provide 95-NM peak torque, 95% efficiency at 12,000-rpm rated speed. The control winding of each BDFM is fed by a SiC-based two-level 75-kW three-phase inverter, wherein the input 540-V DC bus voltage is supplied by a bidirectional DC power supply, and wherein the fundamental frequency of the inverter (control winding) varies from 0 to 800 Hz corresponding to 0 to 12,000-rpm rotor speed. The TeDP further comprises vector control and field-oriented control (FOC) configured to operate the BDFMs in generating and motoring mode, respectively. The TeDP is further configured for aviation variable-frequency power generation. The TeDP is further configured for aviation propulsion.

As used herein, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A turboelectric distributed propulsion (TeDP) system comprising:
   an engine;
   a generator comprising a plurality of control windings and a plurality of power windings, wherein the generator is driven by the engine;
   a plurality of motors, wherein the power windings of the generator are directly connected to power windings of the motors; and a plurality of bidirectional converters, wherein the control windings of the generator and the motors are controlled by a respective one of the bidirectional converters, wherein the plurality of bidirectional converters have a common direct current (DC) bus, and wherein the power windings of the generator are directly connected to power windings of the motors via an alternating current (AC) bus.

2. The TeDP system of claim 1, wherein the DC bus is fed by an energy storage system when it is a hybrid TeDP, or a DC bus of a back-to-back converter which takes the generator power windings as the primary AC power source when it is a regular TeDP.

3. The TeDP system of claim 1, wherein mechanical power is converted to three-phase, electrical power in stator windings of the generator.

4. A turboelectric distributed propulsion (TeDP) system comprising:

a first brushless doubly-fed machine (BDFM); and a second BDFM, wherein the first BDFM is configured as a generator, and the second BDFM is configured as a motor, and wherein each BDFM includes a control winding and a power winding on a stator, wherein control winding is fed by a converter, and wherein the power winding connects to an alternating current (AC) bus.

5. The TeDP system of claim 4, wherein the generator is a stand-alone generator and the second BDFM is a propulsive motor.

6. The TeDP system of claim 4, wherein a terminal voltage of each power winding is equal.

7. The TeDP system of claim 4, when in self-start mode, the generator operates as a motor, and the motor operates in generating mode.

8. A turboelectric distributed propulsion (TeDP) system comprising:

a plurality of brushless doubly-fed machines (BDFMs) configured for use with an aviation application, wherein each BDFM comprises an 8-pole power winding (PW) in the outer two layers and 4-pole control winding (CW) in the inner two layers, and a 6-pole rotor with four pieces of flux guides on each pole.

9. The TeDP of claim 8, further comprising an inverter and a controller.

10. The TeDP of claim 8, further comprising three 120-kW BDFMs and three SiC-based two-level 75-kW three-phase inverters.

11. The TeDP of claim 8, wherein each BDFM is configured to allow a rotational speed up to 12,000 rpm while minimizing the flux leakage and enhancing the electromagnetic coupling between the two windings.

12. The TeDP of claim 8, wherein each BDFM is configured to provide 95-NM peak torque, 95% efficiency at 12,000-rpm rated speed.

13. The TeDP of claim 8, wherein the control winding of each BDFM is fed by a SiC-based two-level 75-kW three-phase inverter, wherein the input 540-V DC bus voltage is supplied by a bidirectional DC power supply, and wherein the fundamental frequency of the inverter (control winding) varies from 0 to 800 Hz corresponding to 0 to 12,000-rpm rotor speed.

14. The TeDP of claim 8, further comprising vector control and field-oriented control (FOC) configured to operate the BDFMs in generating and motoring mode, respectively.

15. The TeDP of claim 8, further configured for aviation variable-frequency power generation.

16. The TeDP of claim 8, further configured for aviation propulsion.

* * * * *

UNITED STATES PATENT AND TRADEMARK OFFICE
CERTIFICATE OF CORRECTION

PATENT NO. : 11,661,201 B2
APPLICATION NO. : 17/206354
DATED : April 25, 2023
INVENTOR(S) : Julia Zhang et al.

Page 1 of 1

It is certified that error appears in the above-identified patent and that said Letters Patent is hereby corrected as shown below:

In the Claims

Column 12, Claim 1, Line 8, delete "are" and insert -- are individually --.

Column 13, Claim 3, Line 2, delete "three-phase," and insert -- three-phase --.

Signed and Sealed this
Twenty-second Day of August, 2023

Katherine Kelly Vidal
*Director of the United States Patent and Trademark Office*